United States Patent
Komu et al.

(10) Patent No.: US 11,356,376 B2
(45) Date of Patent: Jun. 7, 2022

(54) SYSTEM IN A DATA PROCESSING NETWORK AND A METHOD THEREIN FOR ENABLING ROUTING OF DATA FLOWS TO OR FROM A SERVICE IN THE DATA PROCESSING NETWORK

(71) Applicant: Telefonaktiebolaget LM Ericsson (publ), Stockholm (SE)

(72) Inventors: Miika Komu, Helsinki (FI); Alireza Ranjbar, Espoo (FI); Patrik Salmela, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/979,759

(22) PCT Filed: Mar. 12, 2018

(86) PCT No.: PCT/SE2018/050238
§ 371 (c)(1),
(2) Date: Sep. 10, 2020

(87) PCT Pub. No.: WO2019/177502
PCT Pub. Date: Sep. 19, 2019

(65) Prior Publication Data
US 2021/0044532 A1 Feb. 11, 2021

(51) Int. Cl.
*H04L 47/2441* (2022.01)
*H04L 45/64* (2022.01)
(Continued)

(52) U.S. Cl.
CPC .......... *H04L 47/2441* (2013.01); *H04L 45/02* (2013.01); *H04L 45/64* (2013.01);
(Continued)

(58) Field of Classification Search
CPC ..... H04L 47/2441; H04L 45/02; H04L 45/38; H04L 45/64; H04L 47/762; H04L 47/783; H04L 47/828; H04L 45/44; H04L 45/306
See application file for complete search history.

(56) References Cited

U.S. PATENT DOCUMENTS 9,716,653 B2 * 7/2017 Gage ................... H04L 47/18
2015/0381493 A1 * 12/2015 Bansal ................. H04L 45/745
370/392

(Continued)

OTHER PUBLICATIONS

Domain Isolation in a Multi-Tenant Software-Defined Network by Alireza Ranjbar et al.; 2015 IEEE/ACM 8th International Conference on Utility and Cloud Computing—2015.

(Continued)

*Primary Examiner* — Mohamed A Kamara
(74) *Attorney, Agent, or Firm* — Baker Botts, LLP

(57) ABSTRACT

Embodiments herein relate to a method performed by a network controller node (130) in a data processing network (100) for enabling routing of data flows to or from a service (150) in the data processing network (100). The network controller node (130) receives information indicating network requirements on the data processing network (100) by a service (150) to be initiated in the data processing network (100). Also, the network controller node (130) determines a network identifier for the service (150) in the data processing network (100) based on the obtained network requirements. Embodiments herein also relate to a method performed by a resource controller node (140) in a data processing network (100) for enabling routing of data flows to or from a service (150) in the data processing network (100). The resource controller node (140) obtains information indicating network requirements on the data processing network (100) by a service (150) to be initiated in the data processing network (100). Also, the resource controller node (Continued)

(140) determine a network identifier for the service (150) in the data processing network (100) based on the obtained network requirements. Furthermore, embodiments herein also relate to a network controller node (130) and a resource controller node (140) for enabling routing of data flows to or from a service (150) in the data processing network (100).

18 Claims, 7 Drawing Sheets

(51) Int. Cl.
H04L 45/02 (2022.01)
H04L 47/762 (2022.01)
H04L 47/783 (2022.01)
H04L 47/70 (2022.01)

(52) U.S. Cl.
CPC .......... *H04L 47/762* (2013.01); *H04L 47/783* (2013.01); *H04L 47/828* (2013.01)

(56) References Cited

U.S. PATENT DOCUMENTS

| | | | |
|---|---|---|---|
| 2016/0062746 A1* | 3/2016 | Chiosi | G06F 8/35 717/104 |
| 2018/0248827 A1* | 8/2018 | Scharber | H04L 67/141 |
| 2019/0173784 A1* | 6/2019 | Guichard | H04L 45/64 |

OTHER PUBLICATIONS

SDN Controller for Context-Aware Data Delivery in Dynamic Service Chaining by B. Martini et al.—IEEE 2015.
PCT International Search Report issued for International application No. PCT/2018/050238—dated Oct. 12, 2018.
Shadow MACs: Scalable Label-Switching for Commodity Ethernet by Kanak Agarwal—2014.
PCT Written Opinion of the International Searching Authority issued for International application No. PCT/SE2018/050238—dated Oct. 12, 2018.
Communication Pursuant To Article 94(3) EPC issued by the European Patent Office for Application No. 18 721 507.4-1215—dated Dec. 17, 2021.
B. Martini et al., SDN controller for Context-aware Data Delivery in Dynamic Service Chaining, IEEE—2015.
Communication Pursuant To Article 94(3) EPC issued for Application No. 18 721 507.4-1215—dated Dec. 17, 2021.

* cited by examiner

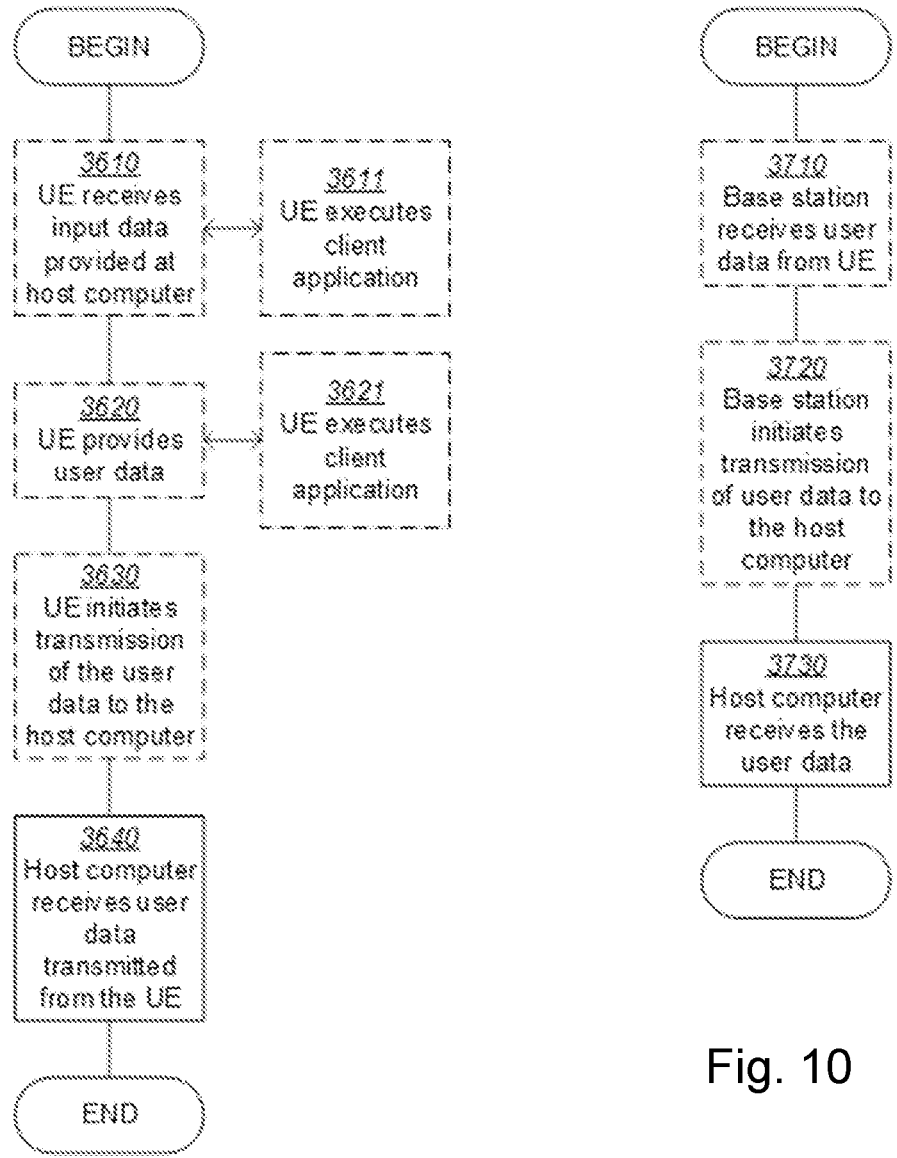

SYSTEM IN A DATA PROCESSING NETWORK AND A METHOD THEREIN FOR ENABLING ROUTING OF DATA FLOWS TO OR FROM A SERVICE IN THE DATA PROCESSING NETWORK

PRIORITY

This nonprovisional application is a U.S. National Stage Filing under 35 U.S.C. § 371 of International Patent Application Serial No. PCT/SE2018/050238 filed Mar. 12, 2018 and entitled "A System in a Data Processing Network and a Method Therein for Enabling Routing of Data Flows to or From a Service in the Data Processing Network" which is hereby incorporated by reference in its entirety.

TECHNICAL FIELD

Embodiments herein relate to routing of data flows in a data processing network. In particular, embodiments herein relate to a system in a data processing network and a method therein for enabling routing of data flows to or from a service in the data processing network.

BACKGROUND

The advent of Software-Defined Networking, SDN, has improved network routing or forwarding operations in different data processing networks, such as, different cloud-type networks (e.g. public, private, hybrid, etc.) or cloud networks (e.g. centralized, distributed, multi-cloud, fog, device, etc.) or other types of networks, by adding more control over the data flows therein. An advantage of using an SDN network is that it allows the data processing network to route or forward the data flows from a centralized control point.

In SDN, routers or switches often forward a new data flow to a network controller node, often referred to as an SDN controller, in the data processing network. The network controller node then determines how the new data flow is to be routed or forwarded in the data processing network. Then, the network controller node provides instructions to the routers or switches in the data processing network on where to route or forward the new data flow. Further, when implementing SDN in a data processing network, such as, a cloud-type or cloud network, a resource controller node, often referred to as a cloud orchestrator, usually sets up and runs services in the data processing network. It may also provide the network controller node with information affecting how the routing or forwarding of the data flows through the data processing network should be performed. This means that the routing or forwarding by routers and switches within the data processing network is conventionally also based on additional routing or forwarding rules and policies that is set up in the network controller node by the resource controller node.

In order to optimize the data processing network and reduce the number of additional routing or forwarding rules and policies that the network controller node in turn needs to configure in the routers and switches within the data processing network, some solutions suggest assigning customized labels to data packets in the data flows in the data processing network, and/or change the headers of data packets in the data flows in the data processing network.

For example, in Ranjbar et al, "Domain Isolation in a Multi-tenant Software-Defined Network", 2015 IEEE/ACM 8th International Conference on Utility and Cloud Computing (UCC), 7-10 Dec. 2015, ISBN 978-0-7695-5697-0, it is shown that different labels may be used to route or forward data flows at the edge and in the core network of the data processing network. At the edge of the data processing network, the SDN controller may assign labels to data packets in the data flows and then route or forward the data flows based on the assigned labels of the data packets throughout the core network of the data processing network. These labels can then be removed before delivering the data packets of the data flow to the destination host.

According to another example, in Agarwal et al, "Shadow MACs: Scalable Label-switching for Commodity Ethernet", Pages 157-162, Sigcomm Hot SDN conference, ACM, 2014, ISBN 978-1-4503-2989-7, it is shown that Media Access Control, MAC, addresses may be used to assign labels to data packets of data flows. In this case, this is performed at the edge of the data processing network by embedding labels in the MAC addresses of the data packets of the data flow, and then route or forward the data packets of the data flow based on the labelled MAC addresses.

However, in setting up and running services in the data processing network, the resource controller node is often blind to the availability of network resources in the data processing network. This may cause a problem as customers of the service in the data processing networks, often referred to as tenants, may request certain qualities of a service which the available network resources in the data processing network may not be able to provide. To solve this issue, further routing or forwarding rules and policies are required to be configured in the data processing network, such as, in the network controller node and the routers and switches in the data processing network.

SUMMARY

An object of the invention is to improve the routing of data flows to or from a service in a data processing network.

According to a first aspect of embodiments herein, the object is achieved by a method performed by a network controller node in a data processing network for enabling routing of data flows to or from a service in the data processing network. The network controller node receives information indicating network requirements on the data processing network by a service to be initiated in the data processing network. Also, the network controller node determines a network identifier for the service in the data processing network based on the obtained network requirements.

According to a second aspect of embodiments herein, the object is achieved by a network controller node in a data processing network for enabling routing of data flows to or from a service in the data processing network. The network controller node is configured to receive information indicating network requirements on the data processing network by a service to be initiated in the data processing network. Also, the network controller node is configured to determine a network identifier for the service in the data processing network based on the obtained network requirements.

According to a third aspect of embodiments herein, the object is achieved by a method performed by a resource controller node in a data processing network for enabling routing of data flows to or from a service in the data processing network. The resource controller node obtains information indicating network requirements on the data processing network by a service to be initiated in the data processing network. Also, the resource controller node determines a network identifier for the service in the data processing network based on the obtained network requirements.

According to a fourth aspect of embodiments herein, the object is achieved by a resource controller node in a data processing network for enabling routing of data flows to or from a service in the data processing network. The resource controller node is configured to obtain information indicating network requirements on the data processing network by a service to be initiated in the data processing network. Also, the resource controller node is configured to determine a network identifier for the service in the data processing network based on the obtained network requirements.

According to a fifth aspect of the embodiments herein, the object is achieved by a system comprising a network controller node and a resource controller node as described above. According to a sixth aspect of the embodiments herein, a computer program is also described configured to perform the method described above. Further, according to a seventh aspect of the embodiments herein, a carrier is also described configured to carry the computer program configured for performing the method described above.

By receiving or obtaining information indicating the network requirements on the data processing network by a service and determining a network identifier for the service in the data processing network based thereon, the network controller node and the resource controller node may tie the network path properties requested by a service for its data flows in the data processing network to the network identifier for the service in the data processing network. In other words, by determining the network identifier for the service by taking the network requirements on the data processing network by the service into account, the network controller node and the resource controller node may determine network identifiers which inherently confers routing or forwarding information within the data processing network. Since this reduces the need for additional routing or forwarding rules and policies in the data processing network, these network identifiers will enable a more efficient routing and/or forwarding of the data flows to or from the service in the data processing network. Hence, the routing of data flows in a data processing network is improved.

Further possible features and benefits of this solution will become apparent from the detailed description below.

BRIEF DESCRIPTION OF THE DRAWINGS

Embodiments will now be described in more detail in relation to the enclosed drawings, in which:

FIGS. 9-10 are flowcharts illustrating methods implemented in a communication system including a host computer, a base station and a user equipment.

DETAILED DESCRIPTION

Figure 1:
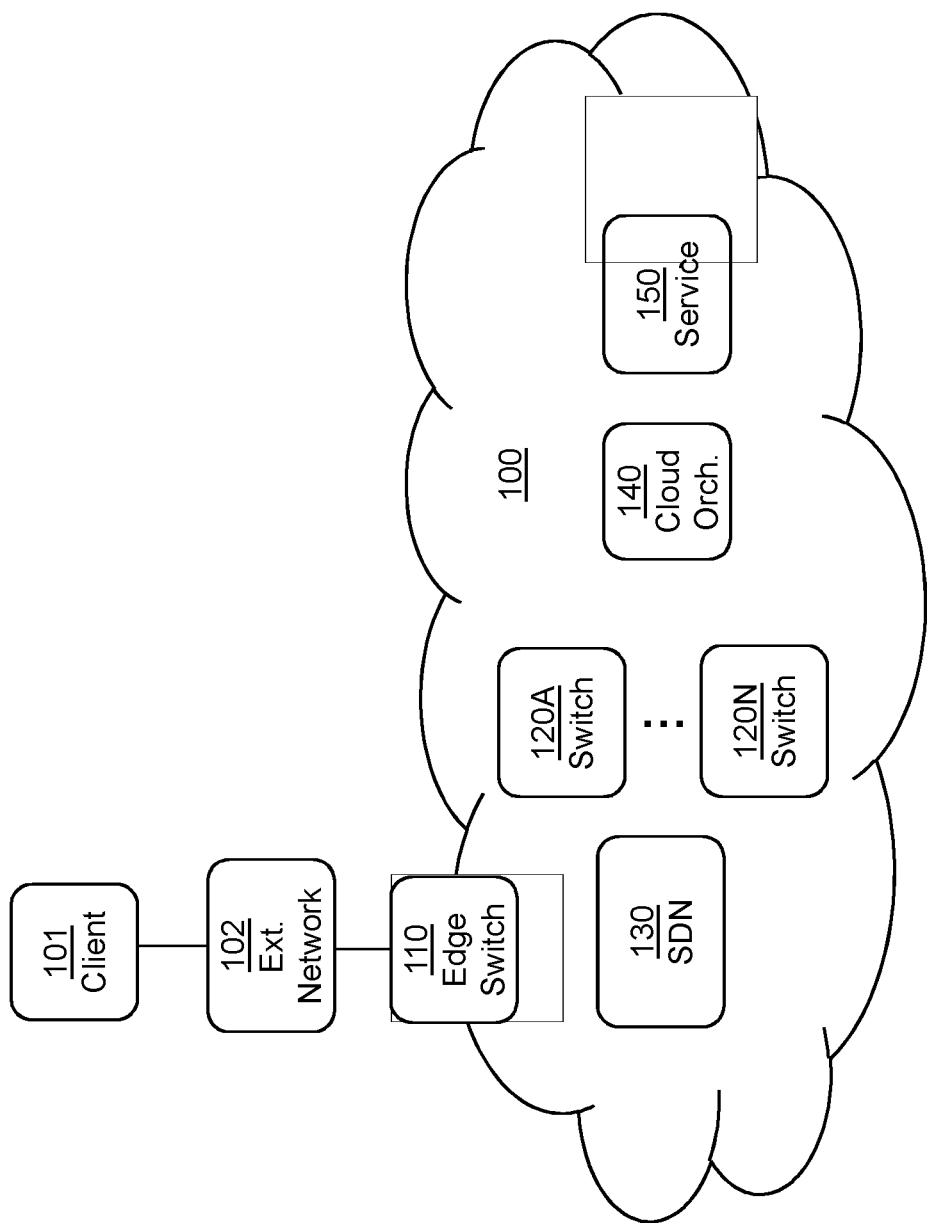
FIG. 1 is a schematic illustration depicting embodiments of a system in a data processing network.

The figures herein are schematic and simplified for clarity, and they merely show details which are essential to the understanding of the embodiments presented herein, while other details have been left out. Throughout, the same reference numerals are used for identical or corresponding parts or steps.

FIG. 1 depicts a data processing network 100 in which embodiments of the system and method described herein may be implemented. The data processing network 100 may be a Software-Defined Network, SDN. The data processing network 100 may also comprise a cloud-type network, such as, e.g. public, private, hybrid, etc., or a cloud network, such as, e.g. centralized cloud network, distributed cloud network, multi-cloud network, fog network, device network, etc., employing SDN. However, the data processing network 100 may also comprise other types of data communications networks employing SDN. The data processing network 110 may also form what may conventionally be referred to as a data center. A data processing network, such as, the data processing network 100, is usually provided for performing a service 150, wherein one or more servers or server clusters within the data processing network are configured to execute the service 150.

The data processing network 100 may comprise an edge switch 110. The edge switch 110 may be configured to receive a request for a service to be executed by the data processing network 100. In order to facilitate the data flows within the data processing network 100, the data processing network 100 may comprise a number of switches and routers 120A, . . . , 120N. The switches and routers 120A, . . . , 120N may, for example, be Layer 2 Ethernet switches. The switches and routers 120A, . . . , 120N may together with the one or more servers or server clusters form a so-called cloud, i.e. a cloud-computing network that may include a large number of interconnected devices. Each of the switches and routers 120A, . . . , 120N may be connected to the edge switch 110 and to each of the servers in the cluster of servers in the data processing network 100, either directly or indirectly via each other.

For managing the data flows within the data processing network 100, the data processing network 100 may comprise a network controller node 130. The network controller node 130 may also be referred to as, for example, a network controller, a SDN controller, or SDN controller node, etc. The network controller node 130 may be connected to the edge switch 110 and to each of the switches and routers 120A, . . . , 120N, either directly or indirectly via one or more of the other switches and routers 120A, . . . , 120N. The network controller node 130 is configured to control the edge switch 110 and the switches and routers 120A, . . . , 120N in the data processing network 100. This may be performed by the network controller node 130 by providing instructions, e.g. in the form of routing or forwarding rules and policies, to the edge switch 110 and the switches and routers 120A, . . . , 120N. This may be performed using a communications protocol, such as, for example, the OpenFlow protocol.

For managing services in the data processing network 100, the data processing network 100 may comprise a resource controller node 140. The resource controller node 140 may also be referred to as, for example, cloud resource controller, a cloud orchestrator, cloud organising node, or cloud organizing instance, etc. The resource controller node 140 is configured to set up and run the service 150, or service instance, in the data processing network 100 by utilizing the one or more servers or server clusters which may be arranged to execute the service 150. The resource controller node 140 may be configured to start the service 150 in response to receiving a request to start the service 150 from a customer, often referred to as a tenant, of the data processing network 100. The resource controller node 140 may be implemented as a virtual node or computer program that may be run in or across one or more of the one or more servers or server clusters in the data processing network 100 and should therefore not be construed as being limited to be implemented in a single device. Similarly, the service 150 may be run in a virtual machine or a container in the data processing network 100 that may be set up by the resource controller node 140 and run in or across one or more of the one or more servers or server clusters in the data processing network 100 and should also not be construed as being limited to be implemented in a single device.

According to a non-limiting example of how the service 150 may be invoked in the data processing network 100, a client 101, e.g. a client application, client host or another service, e.g. in another data processing network or data center, etc., may be wirelessly connected, or connected via wired connection, to an external network 102, such as, the Internet or other WANs, to which the data processing network 100 is also connected, e.g. via the edge switch 110. The client 101 may initiate communications over the external network 102 with the service 150 inside the data processing network 100 in order to, for example, establish a connection to the service 150 residing in the data processing network 100. Furthermore, although embodiments below are described with reference to FIG. 1, this should not be construed as limiting to the embodiments herein, but merely as an example made for illustrative purposes.

As part of the developing of the embodiments described herein, it has also been noted that, in conventional data processing networks employing SDN, the SDN controller's use of network identifiers requires the SDN controller to determine additional routing or forwarding rules and policies to be configured by the SDN controller in the routers and switches throughout the data processing network in order to be able to meet network requirements of services in the data processing network.

This issue is addressed by the embodiments described herein by obtaining or receiving information indicating the network requirements on the data processing network by a service and determining a network identifier for the service in the data processing network based thereon. In other words, forming the path of the data flow to a service within the data processing network, i.e. how data packets are forwarded or routed within the data processing network, depending on a determined network identifier, e.g. specifically generated IP and/or MAC addresses of the service within the data packets.

One of the advantages of the embodiments described herein is that a more effective way of generating network identifiers for a service is provided in that, instead of as in conventional data processing networks employing SDN generating fixed network identifiers for a service, the system may generate and encode network identifiers for the service based on the network requirements requested by a service and available capacity or network resources of the data processing network. Another advantage of the embodiments described herein is that by embedding routing or forwarding information into the network identifiers of the service, the need for additional routing or forwarding rules and policies that needs to configured in the routers and switches within the data processing network may be significantly limited or reduced. For example, by being able to have additional routing or forwarding rules and policies that apply to multiple different types of services with similar network requirements, e.g. using MAC addresses with partially same information encoded for the multiple different types of services.

Figure 2:
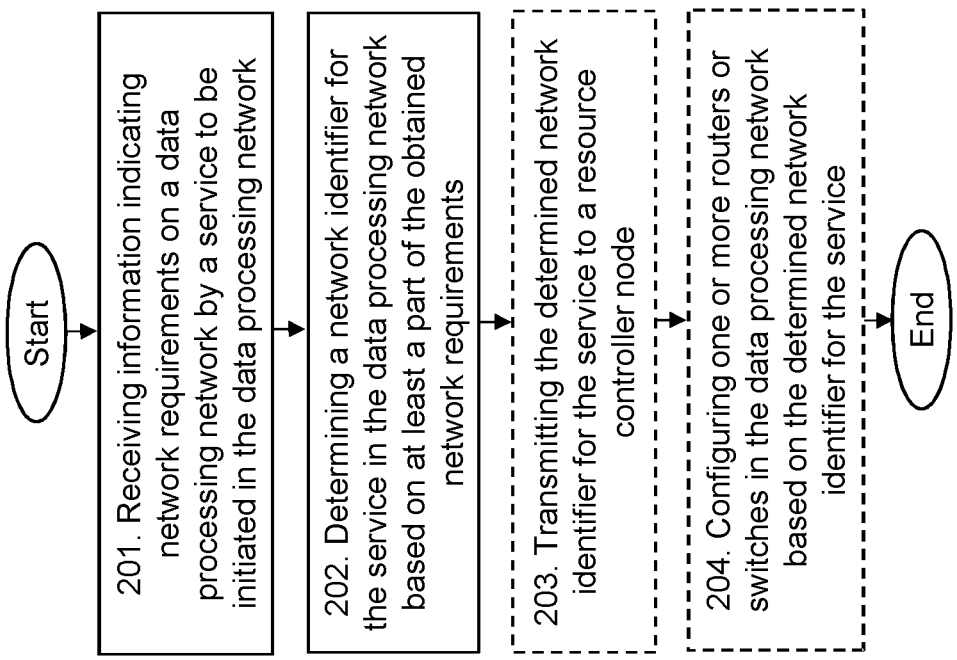
FIG. 2 is a flow chart of embodiments of a method performed by a network controller node in a data processing network.

Example of embodiments of a method performed by a network controller node 130 in a data processing network 100 for enabling routing of data flows to or from a service 150 in the data processing network 100 will now be described with reference to the flowchart depicted in FIG. 2. FIG. 2 is an illustrated example of actions or operations which may be taken by the network controller node 130 in a data processing network 100. According to some embodiments, the network controller node 130 may be a Software-Defined Network, SDN, controller.

Action 201

First, the network controller node 130 receives information indicating network requirements on the data processing network 100 by a service 150 to be initiated in the data processing network 100. For example, the received network requirements to a network controller node 130 may be transmitted from a resource controller node 140. In this case, the resource controller node 140 may in turn have obtained the network requirements from, for example, a customer/tenant of the service 150 in the data processing network 100. For example, the customer/tenant of the service 150, or an automated process associated with the resource controller node 140, may have specified and requested the service 150 and the network requirements thereof. The resource controller node 140 may be a cloud orchestrator.

In some embodiments, the network requirements on the data processing network 100 by the service 150 may comprise requirements related to Quality-of-Service, QoS, of the data flows to or from the service 150, requirements related to security of the data flows to or from the service 150, and/or requirements related directly to the path characteristics of the data flows to or from the service 150 in the data processing network 100. Examples of such network requirements, or network property requirements, may be QoS requirements, such as, e.g. bandwidth, latency, etc., or security requirements, such as, e.g. the use of Virtual Private Networks (VPN), network slicing, firewall, Deep Packet Inspection (DPI), etc. According to a simple and illustrative example, the network requirements of the service 150 may indicate that the data flow of the service 150 should first be processed by a NAT, Network Address Translation, function before being processed by a firewall functionality, while the data flow of another service may be directed directly to a firewall functionality. In some embodiments, the network requirements of the service 150 may relate directly to path characteristics of the data flow by, for example, indicating a preferred explicit network path, or properties thereof, for data flows within the data processing network 100.

Action 202

After receiving the information in Action 201, the network controller node 130 determines a network identifier for the service 150 in the data processing network 100 based on the obtained network requirements. This means that the network controller node 130 may generate network identifiers for the service 150 which inherently confers routing or forwarding information within the data processing network 100.

According to some embodiments, this may be performed by the network controller node 130 by selecting an appropriate path for the data flows to and from the service 150 within the data processing network 100 based on at least some of the network requirements of the service 150 and in view of the available network resources in the data processing network 100. The available network resources may, for example, refer to the capacity of the switches and routers 120A, . . . , 120N in the data processing network 100 to process data packets. For example, the service 150 may as a network requirement refer to a specific required bandwidth on a specific path in the data processing network 100 or refer to a specific capacity of the switches and routers 120A, . . . , 120N. However, the switches and routers 120A, . . . , 120N may have limited capacity, e.g. in terms of CPU and/or memory, to process all data packets. Since the network controller node 130 is aware of the capacity of the switches and routers 120A, . . . , 120N in the data processing network 100, this may be used in order to select an appropriate path for the data flows to and from the service 150 within the data processing network 100.

Optionally, in some embodiments, the determined network identifiers may be statically determined for different types of services in the resource controller node 140 based on different network requirements; that is, a resource controller node 140 may select and generate a suitable network identifier for the service 150 directly, i.e. without employing the network controller node 130, based on predetermined network identifiers. In this case, the predetermined network identifiers may be part of a set of network identifiers that has been determined in advance and been statically set by the resource controller node 140 and the network controller node 130, e.g. taking into account the available network resources in the data processing network 100. Here, the different determined network identifiers may reflect different network requirements and correspond to the available network resources in the data processing network 100. It should also be noted that the network controller node 130 in this case is aware of the determined network identifiers in the resource controller node 140 and how to control the routing or forwarding of the data flows based on the these predetermined network identifiers. According to one simple and illustrative example, the network controller node 130 may, for example, notify the resource controller node 140 that data flows with data packets having prefix 10.1.0.0/16 will go through a firewall functionality, while data flows with data packets having prefix 10.2.0.0/16 will not. This enables the resource controller node 140 to then allocated and assign MAC/IP addresses from those prefixes according to obtained network requirements of services from the tenants of the service in the data processing network 100.

In some embodiments, the network controller node 130 may encode, or use, the determined network identifier as a label, a header or network address information of data packets in data flows to or from the service 150 in the data processing network 100. This means that the path of data packets in the data flow to and from a service 150 in the data processing network 100, i.e. how the data packets are forwarded or routed through the data processing network 100, is made to depend on the determined network identifier, e.g. an IP and/or MAC address of the data packets in the data flow.

In some embodiments, a network controller node 130 may, for example, encode one or more bits into the IP and/or MAC address of the data packets of the data flow to and from the service 150, whereby the bit or bits may indicate which path through the data processing network 100 that the data packets of the data flow should be routed or forwarded. According to one illustrative example, a designated bit in the MAC addresses of the data packets of data flows may be reserved to, for example, indicate if a data packet should go through a specific router or switch in the data processing network 100, such as, e.g. a switch capable of providing Deep Packet Inspection, DPI. Thus, all virtual machines or containers running a service requiring DPI will have a MAC address with the designated bit set to "1", while all others will have the designated bit set to "0". One advantage is that, in this case, a single rule could be configured by a network controller node 130 at a suitable router or switch, e.g. a router or switch close to the DPI capable router or switch, stating that if the designated bit of the source MAC address of a received data packet is "1", then the data packet should be routed or forwarded via the DPI capable router or switch. Another less efficient alternative that may be found in prior art is to instead have a single rule per data flow. This may however add to the number of rules for the router or switch to handle. The logic of which part of the IP and/or MAC address that indicates which type of routing or forwarding should be performed may be customized and defined for each specific network controller node 130 when implemented in a data processing network 100.

It should also be noted that optionally, when e.g. a MAC address is not enough to encode all network requirements of the service 150, the network controller node 130 may also in a similar way manipulate IP addresses provided as response to Dynamic Host Configuration Protocol, DHCP, requests from the virtual machine or container running the service 150 in order to guarantee the requested network requirements for the service 150. Alternatively, the MAC and IP addresses for the service in this case also be statically determined by the network controller node 130. For example, the resource controller node 140 may request the network controller node 130 to provide static MAC and IP addresses, whereby the network controller node 130 may respond with static MAC and IP addresses with the network requirements encoded therein in a suitable way. These embodiments are described in more detail in Action 305-308 with reference to FIG. 3 below.

Optionally, in some embodiments, the network controller node 130 may map the received network requirements of the service 150 in the data processing network 100 to the determined network identifier in the network controller node 130. For example, the network controller node 130 may create and store a mapping between the network identifiers that are determined for different services and their corresponding requested network requirements. In other words, the network controller node 130 may, for example, maintain a separate database that maps MAC and/or IP addresses of the data packets to routing and/or Quality-of-Service, QoS, properties for the data flow. In this way, once a service 150 is requested using a determined network identifier, the network controller node 130 will be aware of the requested network requirements of the service 150 and control the routing or forwarding of the data flow to or from the service 150 within the data processing network 100 accordingly.

Action 203

Optionally, after the determination of the network identifiers in Action 202, the network controller node 130 may transmit information indicating the determined network identifier for the service 150 to a resource controller node 140. Hence, the network controller node 130 may provide the resource controller node 140 with an network identifier for the service 150 which inherently confers routing or forwarding information within the data processing network 100 in accordance with the network requirements of the service 150. This may serve as a trigger for the resource controller node 140 to initiate the service 150 in the data processing network 100 to which it may assign the determined network identifier. For example, the resource controller node 140 may initiate the service 150 by starting a virtual machine or container running in the data processing network 100 configured to execute and perform the service 150. This may, for example, be performed by a resource controller node 140 in the system by setting up and starting the virtual machine, VM, or container on one or more of the servers or server clusters in the data processing network 100.

Action 204

Optionally, in some embodiments, the system may configure one or more network routers or switches 120A, . . . , 120N in the data processing network 100 based on the determined network identifier for the service 150. This means that the network controller node 130 may provide instructions, such as, for example, routing and forwarding rules and policies, based on the determined network identifier for the service 150 to the edge switch 110 and the switches and routers 120A, . . . , 120N in the data processing network 100. For this, the network controller node 130 may use a communications protocol, such as, for example, the OpenFlow protocol.

In some embodiments, this configuration may be performed by the network controller node 130 in response to receiving a request message for the service 150. According to this reactive approach, the network controller node 130 may configure one or more network routers or switches 120A, . . . , 120N in the data processing network 100 based on the determined network identifier for the service 150 when it receives a request for the service 150 from the edge switch 110. This reactive approach may provide an advantage in that it may save resources in the one or more network routers or switches 120A, . . . , 120N in the data processing network 100, since they will expect to be provided with the rules and policies on-demand. Additionally, this reactive approach may also be advantageous in that it adds a higher level of security and enhances the control of the routing and forwarding rule and policy control in the data processing network 100.

Alternatively, in some embodiments, the configuration may be performed by the network controller node 130 prior to receiving a request message for the service 150. According to this more proactive approach, the network controller node 130 may configure one or more network routers or switches 120A, . . . , 120N in the data processing network 100 based on the determined network identifier for the service 150 after the network identifier for the service 150 has been determined, but prior to receiving any requests for the service 150 from the edge switch 110. This means, for example, that the network controller node 130 may select and control the path of the data flow destined to the service 150 identified by the determined network identifier before it receives a request for the service 150 from the edge switch 110. This approach may provide an advantage in that it may further reduce latency for the data flow to or from the service 150 in the data processing network 100.

It should also be noted that one advantage of the embodiments described above is that it utilizes existing network identifiers, such as, e.g. MAC and/or IP addresses, and thus do not mandate any new type of labelling or tunnelling to be implemented in the data processing network 100.

Figure 3:
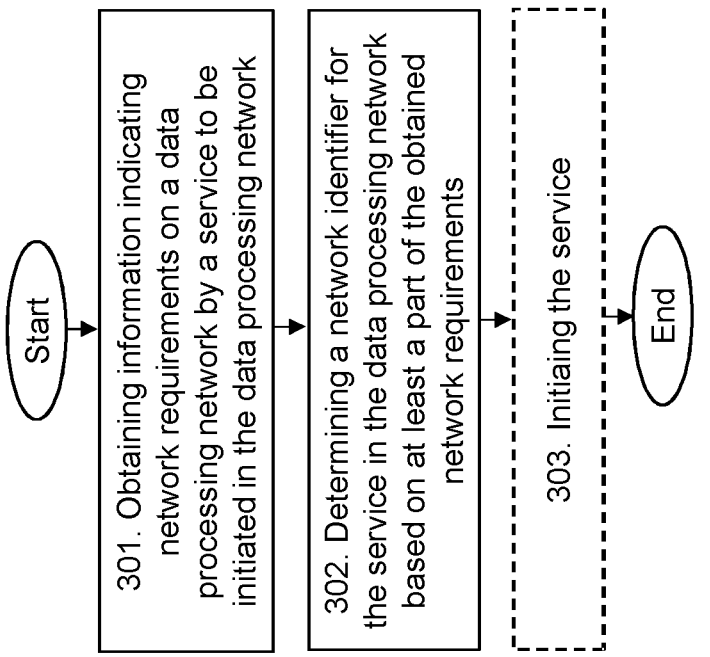
FIG. 3 is a flow chart of embodiments of a method performed by a resource controller node in a data processing network.

Example of embodiments of a method performed by a resource controller node 140 in a data processing network 100 for enabling routing of data flows to or from a service 150 in the data processing network 100 will now be described with reference to the flowchart depicted in FIG. 3. FIG. 3 is an illustrated example of actions or operations which may be taken by the resource controller node 140 in a data processing network 100. According to some embodiments, the resource controller node 140 may be a cloud orchestrator.

Action 301

First, the resource controller node 140 obtains information indicating network requirements on the data processing network 100 by a service 150 to be initiated in the data processing network 100. This means that the resource controller node 140 may obtain network requirements that has been specified and requested for the service 150 by, for example, a customer/tenant of the service 150 in the data processing network 100. This may, for example, be performed by the resource controller node 140 by receiving information or input from the customer/tenant of the service 150, or from an automated process associated with the resource controller node 140, indicating the network requirements on the data processing network 100 by a service 150 to be initiated in the data processing network 100.

In some embodiments, the network requirements on the data processing network 100 by the service 150 may comprise requirements related to Quality-of-Service, QoS, of the data flows to or from the service 150, requirements related to security of the data flows to or from the service 150, and/or requirements related directly to the path characteristics of the data flows to or from the service 150 in the data processing network 100. Examples of such network requirements, or network property requirements, may be QoS requirements, such as, e.g. bandwidth, latency, etc., or security requirements, such as, e.g. the use of Virtual Private Networks (VPN), network slicing, firewall, Deep Packet Inspection (DPI), etc. In some embodiments, the network requirements of the service 150 may relate directly to path characteristics of the data flow by, for example, indicating a preferred explicit network path, or properties thereof, for data flows within the data processing network 100.

Action 302

After obtaining the information in Action 301, the resource controller node 140 determines a network identifier for the service 150 in the data processing network 100 based at least partly on the obtained network requirements. This means that the resource controller node 140 may obtain network identifiers for the service 150 which inherently confers routing or forwarding information within the data processing network 100. According to some embodiments, this may be performed by the resource controller node 140 by transmitting the obtained information to a network controller node 130. In this case, the network controller node 130 may receive the information comprising the network requirements, and select an appropriate path for the data flows to and from the service 150 within the data processing network 100 based on at least some of the received network requirements of the service 150 and in view of the available network resources in the data processing network 100. The network controller node 130 may then transmit the determined network identifier for the service 150 to the resource controller node 140. Hence, the resource controller node 140 may receive a network identifier for the service 150 in the data processing network 100. The determined network identifier will thus in this case be based on the obtained network requirements by the resource controller node 140.

Optionally, according to some embodiments, the determined network identifiers may be statically determined for different services in the resource controller node 140 based on different network requirements, that is, the resource controller node 140 may select and generate a suitable network identifier for the service 150 directly, i.e. without employing the network controller node 130, based on predetermined network identifiers. In this case, the predetermined network identifiers may be part of a set of network identifiers that has been determined in advance and been statically set by the resource controller node 140 and the network controller node 130, e.g. taking into account the available network resources in the data processing network 100. Here, the different determined network identifiers may reflect different network requirements and correspond to the available network resources in the data processing network 100. It should also be noted that the network controller node 130 in this case is aware of the determined network identifiers in the resource controller node 140 and how to control the routing or forwarding of the data flows based on the these predetermined network identifiers. According to one simple and illustrative example, the network controller node 130 may, for example, notify the resource controller node 140 that data flows with data packets having prefix 10.1.0.0/16 will go through a firewall functionality, while data flows with data packets having prefix 10.2.0.0/16 will not. This enables the resource controller node 140 to then allocated and assign MAC/IP addresses from those prefixes according to obtained network requirements of services from the tenants of the service in the data processing network 100. In other words, the resource control node 140 may comprise predetermined network identifiers for different network requirements that it may assign to a service 150 upon receiving a request for a service 150 indicating specific network requirements.

In some embodiments, the determined network identifier may be encoded in, or used as, a label, a header or network address information of data packets in data flows to or from the service 150 in the data processing network 100.

Action 303

After determining the network identifier of the service 150 in Action 202, the resource controller node 140 may initiate the service 150 in the data processing network 100, wherein the service 150 is assigned the determined network identifier for the service 150. This means that the resource controller node 140 may transmit information comprising the determined network identifier to one or more servers indicating to one or more servers or server clusters to begin performing the service 150 using the assigned network identifier. In some embodiments, this may be performed by the resource controller node 140 by starting a virtual machine or container running in the data processing network 100 configured to execute and perform the service 150. The virtual machine or container may be hosted in the one or more servers or server clusters in the data processing network 100.

More detailed embodiments of the network controller node 130 and the resource controller node 140 and the method therein will now be described in further detail below with reference to the example illustrated in FIG. 3.

Figure 4:
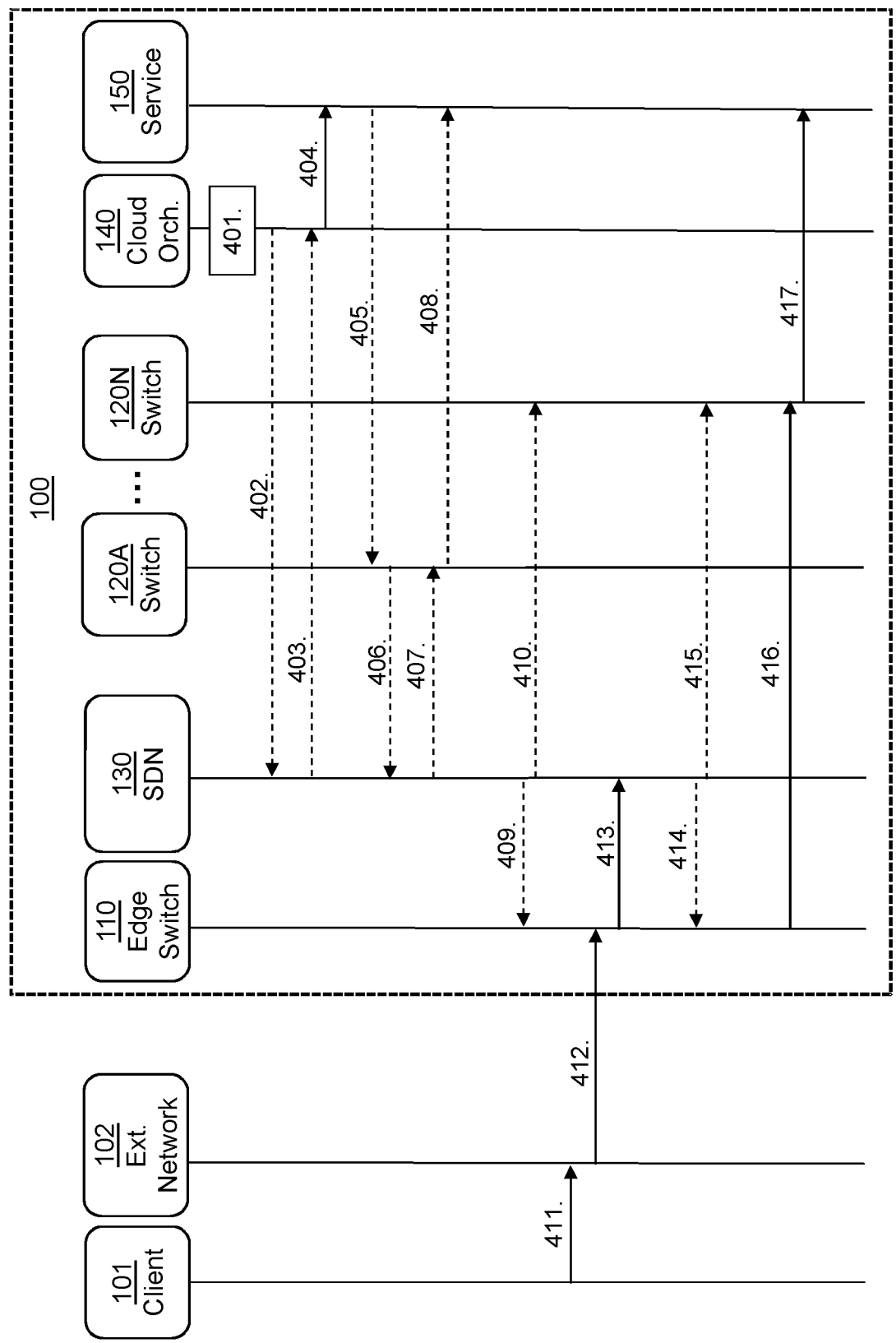
FIG. 4 is a signalling diagram depicting further embodiments of methods in a network controller node and a resource controller node.

FIG. 4 illustrates a signalling diagram according to example of more detailed embodiments of the network controller node 130 and the resource controller node 140 as described above.

Action 401. Optionally, prior to this action, it may be that the resource controller node 140, e.g. cloud orchestrator, has requested information from the network controller node 130, e.g. SDN controller, regarding the network properties or requirements that are allowed for a specific tenant or customer (which also may be a user or automated process associated with the data processing network 100) that is requesting the service 150 in the data processing network 100. The tenant or customer may then select among the allowed network properties or requirements, or e.g. a limited selecting thereof based on the type of subscription the tenant has with the resource controller node 140, in accordance with its service requirements. Then, the tenant or customer may trigger a request to the resource controller node 140 to start the service 150 in accordance with the selected network properties or requirements. Hence, in this Action 301, the resource controller node 140 may receive the request to start a new service 150 in the data processing network 100. This request may comprise the requested network requirements that the new service 100 has on the data path for the data flow to or from the service 150 within the data processing network 100, e.g. QoS requirements.

Action 402. The resource controller node 140 may transmit the network requirements of the new service 150 to the network controller node 130.

Action 403. In response to receiving the network requirements of the new service 150, the network controller node 130 may, for example, generate an MAC address that it ties to the received network requirements by encoding the network requirements into one or more bits in the generated MAC address. Alternatively, the network controller node 130 may create and store a mapping between a MAC address provided by the resource controller node 140 for the service 150 to the received network requirements.

The network controller node 130 may then transmit a response to the resource controller node 140. For embodiments in which a MAC address has been generated, the response may comprise the generated MAC address. In some embodiments, the response may also comprise further information indicating a confirmation or rejection of the received network requirements.

Action 404. The resource controller node 140 receives the response and initiates the service 150, for example, by setting up or starting one or more virtual machines, VMs, or containers on one or more of the servers or server clusters in the data processing network 100. Here, in case the service 150 is only set up, the service 150 may actually be started once its receives some data, i.e. on-demand. The resource controller node 140 may also assign a MAC address to the service 150, e.g. the MAC address generated by the network controller node 130.

Actions 405-408. In case the one or more virtual machines, VMs, or containers running the service 150 employs IPv4, or stateful IPv6, it may request an IP address lease with a Dynamic Host Configuration Protocol, DHCP. In this example, the data packet comprising the DHCP request is transmitted by the service 150 via the switch 120A. The switch 120A may capture the data packet and request that the network controller node 130 process the information therein. In this case, the network controller node 130 may return a DHCP response with an IP address to the service 150 via the switch 120A. The IP address may here comprise one or more bits which may be encoded similarly as described for the generated MAC address in Action 303. Alternatively, a mapping of the IP address to the MAC address of the service 150 may be stored by the network controller node 130. The mapping information may also comprise information about the network requirements. In response to receiving the DHCP response from the switch 120A, the one or more virtual machines, VMs, or containers hosting the service 150 may configure the IP address for its network interface according to the IP address in the DHCP response. It should be noted that Actions 305-308 are optional.

Actions 409-410. In some embodiments, the network controller node 130 may proactively configure the routing or forwarding rules and policies in one or more of the edge switch 110 and/or switches 120A, . . . , 120N. This means that the network controller node 130 may update the QoS and routing information in necessary switches 110, 120A, . . . , 120N. This may comprise installing data flow rules based on the IP or MAC address of the service 150. This also means that the network controller node 130 selects the path for the data packets of the data flows destined to the IP or MAC address of the service 150 in the data processing network 100 before receiving any requests for the service 150 from the edge switch 110.

Actions 411-412. As an example of how the edge switch 110 may receive an initial request from a client 101, the client 101 may, for example, be a browser sending a HTTP GET request towards the service 150. In this case, the service 150 could, for example, be a web service. The HTTP GET request may be delivered to the edge switch 110 via an external network 102, such as, e.g. the Internet.

Action 413. Upon receiving the initial request from the client 101, e.g. the HTTP GET request, the edge switch 110 may, for example, identify the request as part of a new data flow since this is the initial request for the service 150. The edge switch 110 may thus forward the initial request of this new data flow to the network controller node 130, e.g. using an OpenFlow Packet-in message. This occurs unless the network controller node 130 proactively has already configured the routing or forwarding rules and policies in the edge switch 110 for the service 150 as described in Actions 409-410. In this case, the edge switch 110 may directly transmit the HTTP GET request to the service 150 in the data processing network 100 according to its configured routing or forwarding rules and policies.

Actions 414-415. In some embodiments, the network controller node 130 may reactively configure the routing or forwarding rules and policies in one or more of the edge switch 110 and/or switches 120A, . . . , 120N. This means that network controller node 130 may update the QoS and routing information in necessary switches 110, 120A, . . . , 120N in response to receiving the initial request from the edge switch 110. In other words, the network controller node 130 may, based on stored mapping information corresponding to the MAC and/or IP address of the service 150 or bits encoded into the MAC and/or IP address of the service 150, respond to the edge switch 110, while also configuring, or updating, the concerned switches 120A, . . . , 120N that is on the path selected by the network controller node 130. According to one example, the network controller node 130 may, based on the information of MAC address of the requested service 150, select switch 120N to route or forward the HTTP GET request to the service 150.

Actions 416-417. The edge switch 110 may, in response to the configuration or update information from the network controller node 130, route or forward the HTTP GET request to the service 150 via switch 120N in the data processing network 100.

Figure 5:
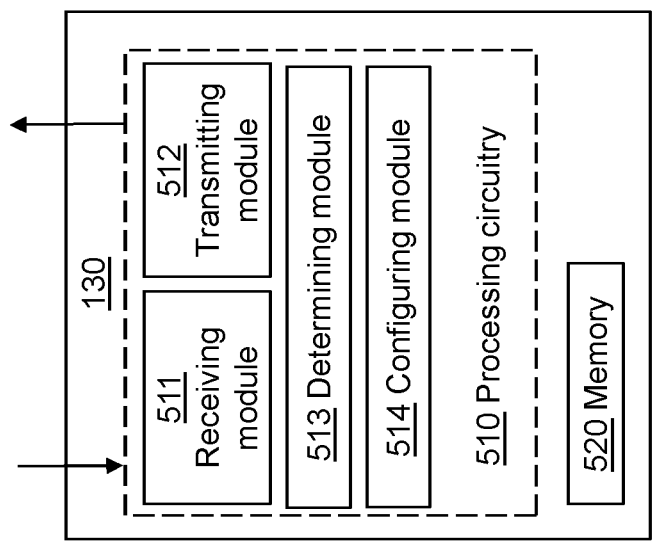
FIG. 5 is a block diagram depicting embodiments of a network controller node.

To perform the method actions of the network controller node 130 for enabling routing of data flows to or from a service 150 in the data processing network 100 described above, the network controller node 130 may comprise the following arrangement depicted in FIG. 5. FIG. 5 shows a schematic block diagram of a network controller node 130.

The network controller node 130 may comprise at least one processing circuitry 510, and a memory 520. The processing circuitry 510 may also comprise a receiving module 511 and a transmitting module 512. The receiving module 511 and the transmitting module 512 are capable of receiving and transmitting data signals from or to other nodes in the data processing network 100, such as, the resource controller node 140, the edge switch 110 and/or router or switches 120A, . . . , 120N. The receiving module 511 and the transmitting module 512 may be implemented using e.g. data communications ports in or connected to the at least one processing circuitry 510. It should also be noted that some or all of the functionality described in the embodiments above as being performed by the network controller node 130 may be provided by the processing circuitry 510 executing instructions stored on a computer-readable medium, such as, e.g. the memory 520 shown in FIG. 5. Alternative embodiments of the network controller node 130 may comprise additional components, such as, for example, a determining module 513 and a configuring module 514, each responsible for providing its respective functionality necessary to support the embodiments described herein.

The network controller node 130 or processing circuitry 510 is configured to, or may comprise a receiving module 511 configured to, receive information indicating network requirements on the data processing network 100 by a service 150 to be initiated in the data processing network 100. Also, network controller node 130 or processing circuitry 510 is configured to, or may comprise a determining module 513 configured to, determine a network identifier for the service 150 in the data processing network 100 based on the obtained network requirements. In some embodiments, the network controller node 130 or processing circuitry 510 may also be configured to, or may comprise a transmitting module 512 configured to, transmit information indicating the determined network identifier for the service 150 to a resource controller node 140.

Further, according to some embodiments, the network controller node 130 or processing circuitry 510 may also be configured to, or may comprise a configuring module 514 configured to, configure one or more network routers or switches 120A, . . . , 120N in the data processing network 100 based on the determined network identifier for the service 150. In this case, according to some embodiments, the network controller node 130 or processing circuitry 510 may also be configured to, or may comprise a configuring module 514 configured to, perform the configuration in response to receiving a request message for the service 150.

In some embodiments, the network requirements on the data processing network 100 by the service 150 may comprise requirements related to Quality-of-Service, QoS, of the data flows to or from the service 150, requirements related to security of the data flows to or from the service 150, and/or requirements related directly to the path characteristics of the data flows to or from the service 150 in the data processing network 100. In some embodiments, the network controller node 130 or processing circuitry 510 may also be configured to, or may comprise a configuring module 514 configured to, encode, or use, the determined network identifier as a label, a header or network address information of data packets in data flows to or from the service 150 in the data processing network 100. Furthermore, in some embodiments, the network controller node 130 or processing circuitry 510 may also be configured to, or may comprise a configuring module 514 configured to, map the received network requirements of the service 150 in the data processing network 100 to the determined network identifier in the network controller node 130. The mapping between the received network requirements and the determined network identifier may, for example, be stored in the memory 520. Also, according to some embodiments, the network controller node 130 may be a Software-Defined Network, SDN, controller and the resource controller node 140 may be a cloud orchestrator.

Furthermore, the embodiments of a network controller node 130 for enabling routing of data flows to or from a service 150 in the data processing network 100 described above may be implemented through one or more processors, such as, e.g. the processing circuitry 510 in network controller node 130 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the network controller node 130. The computer program code may e.g. be provided as pure program code in the network controller node 130 or on a server and downloaded to the network controller node 130. Thus, it should be noted that the modules of the network controller node 130 may in some embodiments be implemented as computer programs stored in memory, e.g. in the memory modules 520 in FIG. 5, for execution by processors or processing modules, e.g. the processing circuitry 510 of FIG. 5. Those skilled in the art will also appreciate that the processing circuitry 510 and the memory 520 described above may refer to a combination of analog and digital circuits, and/or one or more processors configured with software and/or firmware, e.g. stored in a memory, that when executed by the one or more processors such as the processing circuitry 510 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Figure 6:
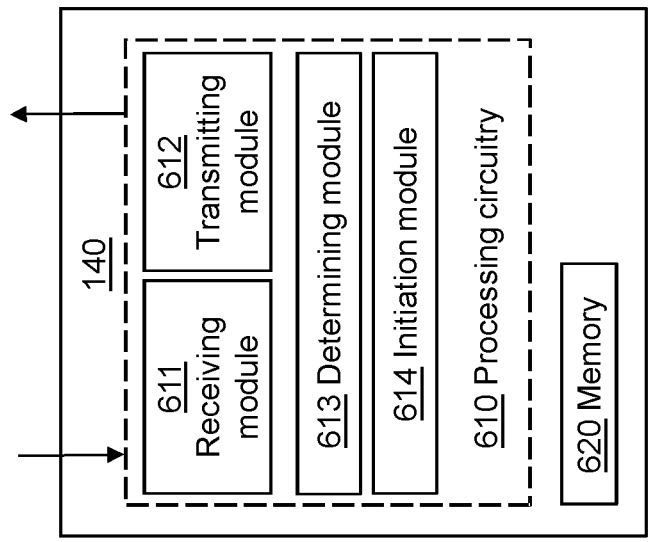
FIG. 6 is a block diagram depicting embodiments of a resource controller node, FIG. 7 schematically illustrates a telecommunication network connected via an intermediate network to a host computer.

Furthermore, to perform the method actions of the resource controller node 130 for enabling routing of data flows to or from a service 150 in the data processing network 100 described above, the resource controller node 130 may comprise the following arrangement depicted in FIG. 6. FIG. 6 shows a schematic block diagram of a resource controller node 130.

The resource controller node 140 may comprise at least one processing circuitry 610, and a memory 620. The processing circuitry 610 may also comprise a receiving module 611 and a transmitting module 612. The receiving module 611 and the transmitting module 612 are capable of receiving and transmitting data signals from or to other nodes in the data processing network 100, such as, e.g. the network controller node 130 and one or more servers capable of performing the service 150 in the data processing network 100. The receiving module 611 and the transmitting module 612 may be implemented using e.g. data communications ports in or connected to the at least one processing circuitry 610. It should also be noted that some or all of the functionality described in the embodiments above as being performed by the resource controller node 140 may be provided by the processing circuitry 610 executing instructions stored on a computer-readable medium, such as, e.g. the memory 620 shown in FIG. 6. Alternative embodiments of the resource controller node 140 may comprise additional components, such as, for example, a determining module 613 and a initiation module 614, each responsible for providing its respective functionality necessary to support the embodiments described herein.

The resource controller node 140 or processing circuitry 610 is configured to, or may comprise a receiving module 611 configured to, obtain information indicating network requirements on the data processing network 100 by a service 150 to be initiated in the data processing network 100. Also, resource controller node 140 or processing circuitry 610 is configured to, or may comprise a determining module 613 configured to, determine a network identifier for the service 150 in the data processing network 100 based on the obtained network requirements.

In some embodiments, the resource controller node 140 or processing circuitry 610 may also be configured to, or may comprise a transmitting module 612 configured to, transmit the obtained information to a network controller node 130 in the data processing network 100. In this case, the resource controller node 140 or processing circuitry 610 may also be configured to, or may comprise a receiving module 612 configured to, receive, from the network controller 130, a network identifier for the service (150) in the data processing network 100. Further, according to some embodiments, the resource controller node 140 or processing circuitry 610 may also be configured to, or may comprise a initiating module 614 configured to, initiate the service 150 in the data processing network 100, wherein the service 150 is assigned the determined network identifier for the service 150. Here, in some embodiments, the resource controller node 140 or processing circuitry 610 may also be configured to, or may comprise a initiating module 614 configured to, initiate the service 150 by starting a virtual machine or container running in the data processing network 100 configured to execute and perform the service 150.

In some embodiments, the network requirements on the data processing network 100 by the service 150 may comprise requirements related to Quality-of-Service, QoS, of the data flows to or from the service 150, requirements related to security of the data flows to or from the service 150, and/or requirements related directly to the path characteristics of the data flows to or from the service 150 in the data processing network 100. In some embodiments, wherein the determined network identifier is encoded in, or use as, a label, a header or network address information of data packets in data flows to or from the service 150 in the data processing network 100. Also, according to some embodiments, the network controller node 130 may be a Software- Defined Network, SDN, controller and the resource controller node 140 may be a cloud orchestrator.

Furthermore, the embodiments of a resource controller node 140 for enabling routing of data flows to or from a service 160 in the data processing network 100 described above may be implemented through one or more processors, such as, e.g. the processing circuitry 610 in resource controller node 140 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 610 in the resource controller node 140. The computer program code may e.g. be provided as pure program code in the resource controller node 140 or on a server and downloaded to the resource controller node 140. Thus, it should be noted that the modules of the resource controller node 140 may in some embodiments be implemented as computer programs stored in memory, e.g. in the memory modules 620 in FIG. 6, for execution by processors or processing modules, e.g. the processing circuitry 610 of FIG. 6. Those skilled in the art will also appreciate that the processing circuitry 610 and the memory 620 described above may refer to a combination of analog and digital circuits, and/or one or more processors configured with software and/or firmware, e.g. stored in a memory, that when executed by the one or more processors such as the processing circuitry 610 perform as described above. One or more of these processors, as well as the other digital hardware, may be comprised in a single application-specific integrated circuit (ASIC), or several processors and various digital hardware may be distributed among several separate components, whether individually packaged or assembled into a system-on-a-chip (SoC).

Additional Aspects

According to a first additional aspect of the embodiments described herein, it is also presented a method implemented in a communication system including a host computer, a base station and a user equipment (UE), the method comprising: at the host computer, receiving user data transmitted to the base station from the UE, wherein the UE transmits a request message for the service 150. In this case, the host computer may be one or more servers or servers clusters running the service 150 in one or more virtual machines or containers within in the data processing network 100. The method may further comprise: at the UE, providing the user data to the base station. The method may further comprise: at the UE, executing a client application, thereby providing the user data to be transmitted; and at the host computer, executing a host application associated with the client application. The method may further comprise: at the UE, executing a client application; and at the UE, receiving input data to the client application, the input data being provided at the host computer by executing a host application associated with the client application, wherein the user data to be transmitted is provided by the client application in response to the input data.

According to a second additional aspect of the embodiments described herein, it is also presented a method implemented in a communication system including a host computer, a base station and a user equipment (UE), the method comprising: at the host computer, providing user data; and at the host computer, initiating a transmission carrying the user data to the UE via a cellular network comprising the base station, wherein the base station transmits a request message for the service 150. The host computer may be one or more servers or servers clusters running the service 150 in one or more virtual machines or containers within in the data processing network 100. The method may further comprise: at the base station, transmitting the user data. A method as described above, wherein the user data is provided at the host computer by executing a host application, and the method further comprises: at the UE, executing a client application associated with the host application, may also be provided.

According to a third additional aspect of the embodiments described herein, it is also presented a communication system including a host computer comprising: a communication interface configured to receive user data originating from a transmission from a user equipment (UE) to a base station, wherein the UE comprises a radio interface and processing circuitry, the UE's processing circuitry configured to: transmit a request message for the service 150. The host computer may be one or more servers or servers clusters running the service 150 in one or more virtual machines or containers within in the data processing network 100. The communication system may further include the UE. The communication system may further include the base station, wherein the base station comprises a radio interface configured to communicate with the UE and a communication interface configured to forward to the host computer the user data carried by a transmission from the UE to the base station. A communication system described above, wherein: the processing circuitry of the host computer is configured to execute a host application; and the UE's processing circuitry is configured to execute a client application associated with the host application, thereby providing the user data may also be provided. A communication system described above, wherein: the processing circuitry of the host computer is configured to execute a host application, thereby providing request data; and the UE's processing circuitry is configured to execute a client application associated with the host application, thereby providing the user data in response to the request data may also be provided.

According to a fourth additional aspect of the embodiments described herein, it is also presented a communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to transmit a request message for the service 150. The host computer may be one or more servers or servers clusters running the service 150 in one or more virtual machines or containers within in the data processing network 100. The communication system may further include the base station. The communication system may further include the UE, wherein the UE is configured to communicate with the base station. A communication system described above, wherein: the processing circuitry of the host computer is configured to execute a host application, thereby providing the user data; and the UE comprises processing circuitry configured to execute a client application associated with the host application may also be provided.

Figure 7:
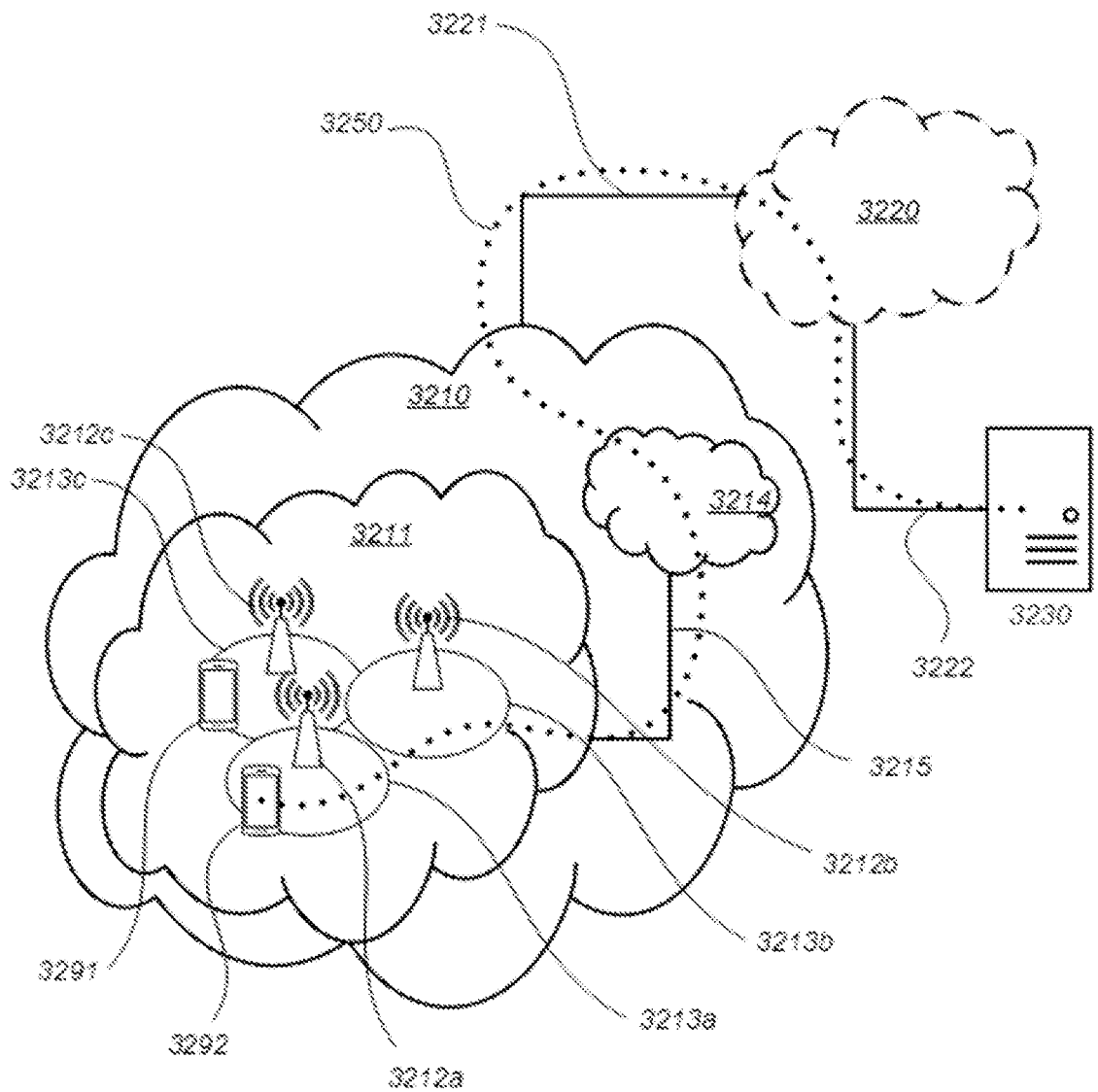

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
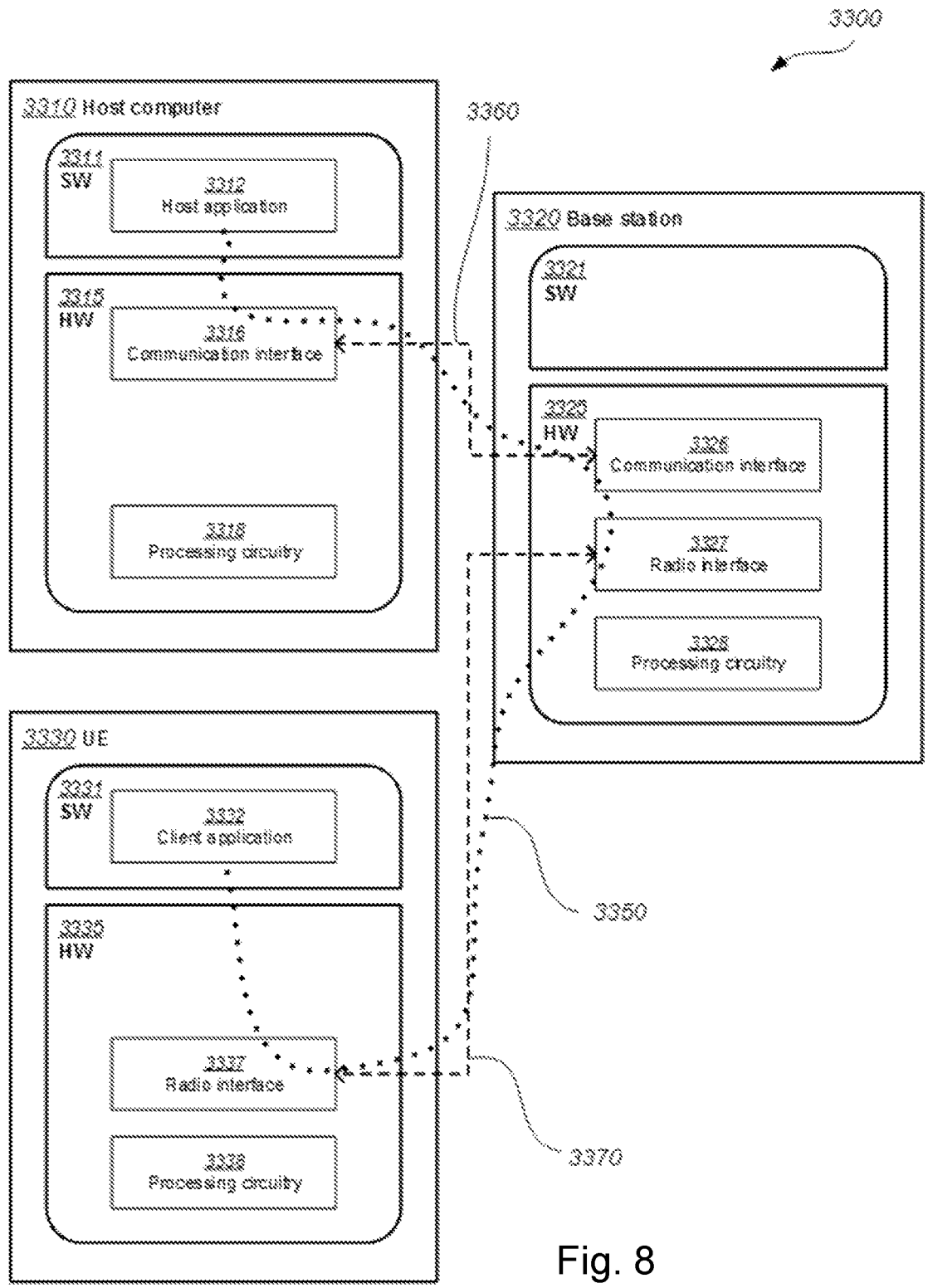
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212a, 3212b, 3212c and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may ensure that the path of the data flow to a service 150 within the data processing network 100, i.e. how data packets are forwarded or routed within the data processing network, may be set up according to the network requirements of the service 150 when said service 150 is invoked by a UE and/or base station with e.g. reduced latency and/or improved security.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7-8. For simplicity of the present disclosure, only drawing references to FIG. 9 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure. In this case, the host computer may be one or more servers or servers clusters running the service 150 in one or more virtual machines or containers within in the data processing network 100.

FIG. 10 is a flowchart illustrating a method implemented in a communication system, in accordance with one embodiment. The communication system includes a host computer, a base station and a UE which may be those described with reference to FIGS. 7-8. For simplicity of the present disclosure, only drawing references to FIG. 10 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station. Also in this case, the host computer may be one or more servers or servers clusters running the service 150 in one or more virtual machines or containers within in the data processing network 100.

The terminology used in the detailed description of the particular embodiments illustrated in the accompanying drawings is not intended to be limiting of the described system or method therein. As used herein, the term "and/or" comprises any and all combinations of one or more of the associated listed items. Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

SDN Software Defined Networking
DPI Deep Packet Inspection
QoS Quality of Service
MAC Media Access Control
IP Internet Protocol
DHCP Dynamic Host Configuration Protocol
HTTP Hypertext Transfer Protocol
VPN Virtual Private Network
VLAN Virtual LAN
LAN Local Area Network
WAN Wide Area Network
NAT Network Address Translation

The invention claimed is:

1. A method performed by a network controller node in a data processing network for enabling routing of data flows to or from a service in the data processing network, the method comprising
   receiving from a resource controller node information indicating network requirements on the data processing network by a service to be initiated in the data processing network, wherein the network requirements comprise requirements related directly to the path characteristics of the data flow to and from the service, wherein the path characteristics comprise indicating a preferred network path and/or properties for the data flows within the data processing network; and
   determining a network identifier for the service in the data processing network based on the obtained network requirements, wherein the network identifier embeds routing or forwarding information and the network identifier is encoded in a label, a header or network address information of data packets in data flows to or from the service in the data processing network; and
   transmitting information indicating the determined network identifier for the service to a resource controller node.

2. The method according to claim 1, further comprising configuring one or more network routers or switches in the data processing network based on the determined network identifier for the service.

3. The method according to claim 2, wherein the configuring is performed in response to receiving a request message for the service.

4. The method according to claim 1, wherein the network requirements on the data processing network by the service may comprise requirements related to Quality-of-Service, QoS, of the data flows to or from the service, and/or requirements related to security of the data flows to or from the service.

5. A network controller node in a data processing network for enabling routing of data flows to or from a service in the data processing network, the network controller node comprising at least one processing circuitry and at least one memory, wherein the at least one memory contains instructions executable by the at least one processing circuitry, the network controller node is configured to
   receive from a resource controller node information indicating network requirements on the data processing network by a service to be initiated in the data processing network, wherein the network requirements comprise requirements related directly to the path characteristics of the data flow to and from the service, wherein the path characteristics comprise indicating a preferred network path and/or properties for the data flows within the data processing network,
   determine a network identifier for the service in the data processing network based on the obtained network requirements, wherein the network identifier embeds routing or forwarding information and the network identifier is encoded in a label, a header or network address information of data packets in data flows to or from the service in the data processing network; and
   transmit information indicating the determined network identifier for the service to a resource controller node.

6. The network controller node according to claim 5, further configured to configure one or more network routers or switches in the data processing network based on the determined network identifier for the service.

7. The network controller node according to claim 6, further configured to perform the configuration in response to receiving a request message for the service.

8. The network controller node according to claim 5, wherein the network requirements on the data processing network by the service may comprise requirements related to Quality-of-Service, QoS, of the data flows to or from the service, and/or requirements related to security of the data flows to or from the service.

9. The network controller node according to claim 5, wherein the network controller node is a Software-Defined Network, SDN, controller and the resource controller node is a cloud orchestrator.

10. A method performed by a resource controller node in a data processing network for enabling routing of data flows to or from a service in the data processing network, the method comprising
    obtaining information indicating network requirements on the data processing network by a service to be initiated in the data processing network, wherein the network requirements comprise requirements related directly to the path characteristics of the data flow to and from the service, wherein the path characteristics comprise indicating a preferred network path and/or properties for the data flows within the data processing network;
    transmitting the obtained information to a network controller node in the data processing network;
    receiving, from the network controller node, a network identifier for the service in the data processing network, wherein the network identifier embeds routing or forwarding information and the network identifier is encoded in a label, a header or network address information of data packets in data flows to or from the service in the data processing network.

11. The method according to claim 10, further comprising initiating the service in the data processing network, wherein the service is assigned the determined network identifier for the service.

12. The method according to claim 11, wherein the initiating comprises starting a virtual machine or container running in the data processing network configured to execute and perform the service.

13. The method according to claim 10, wherein the network requirements on the data processing network by the service may comprise requirements related to Quality-of- Service, QoS, of the data flows to or from the service, and/or requirements related to security of the data flows to or from the service.

14. A resource controller node in a data processing network for enabling routing of data flows to or from a service in the data processing network, the resource controller node comprising at least one processing circuitry and at least one memory, wherein the at least one memory contains instructions executable by the at least one processing circuitry, wherein the resource controller node is configured to
- obtain information indicating network requirements on the data processing network by a service to be initiated in the data processing network, wherein the network requirements comprise requirements related directly to the path characteristics of the data flow to and from the service, wherein the path characteristics comprise indicating a preferred network path and/or properties for the data flows within the data processing network,
- transmit the obtained information to a network controller node in the data processing network, and
- receive, from the network controller node, a network identifier for the service in the data processing network, wherein the network identifier embeds routing or forwarding information and the network identifier is encoded in a label, a header or network address information of data packets in data flows to or from the service in the data processing network.

15. The resource controller node according to claim 14, further configured to initiate the service in the data processing network, wherein the service is assigned the determined network identifier for the service.

16. The resource controller node according to claim 14, further configured to initiate the service by starting a virtual machine or container running in the data processing network configured to execute and perform the service.

17. The resource controller node according to claim 10, wherein the network requirements on the data processing network by the service may comprise requirements related to Quality-of-Service, QoS, of the data flows to or from the service, and/or requirements related to security of the data flows to or from the service.

18. The resource controller node according to claim 14, wherein the network controller node is a Software-Defined Network, SDN, controller and the resource controller node is a cloud orchestrator.

\* \* \* \* \*